(No Model.) 2 Sheets—Sheet 2.
O. P. OLSON.
COMBINED MANURE LOADER AND EXCAVATOR.
No. 539,703. Patented May 21, 1895.
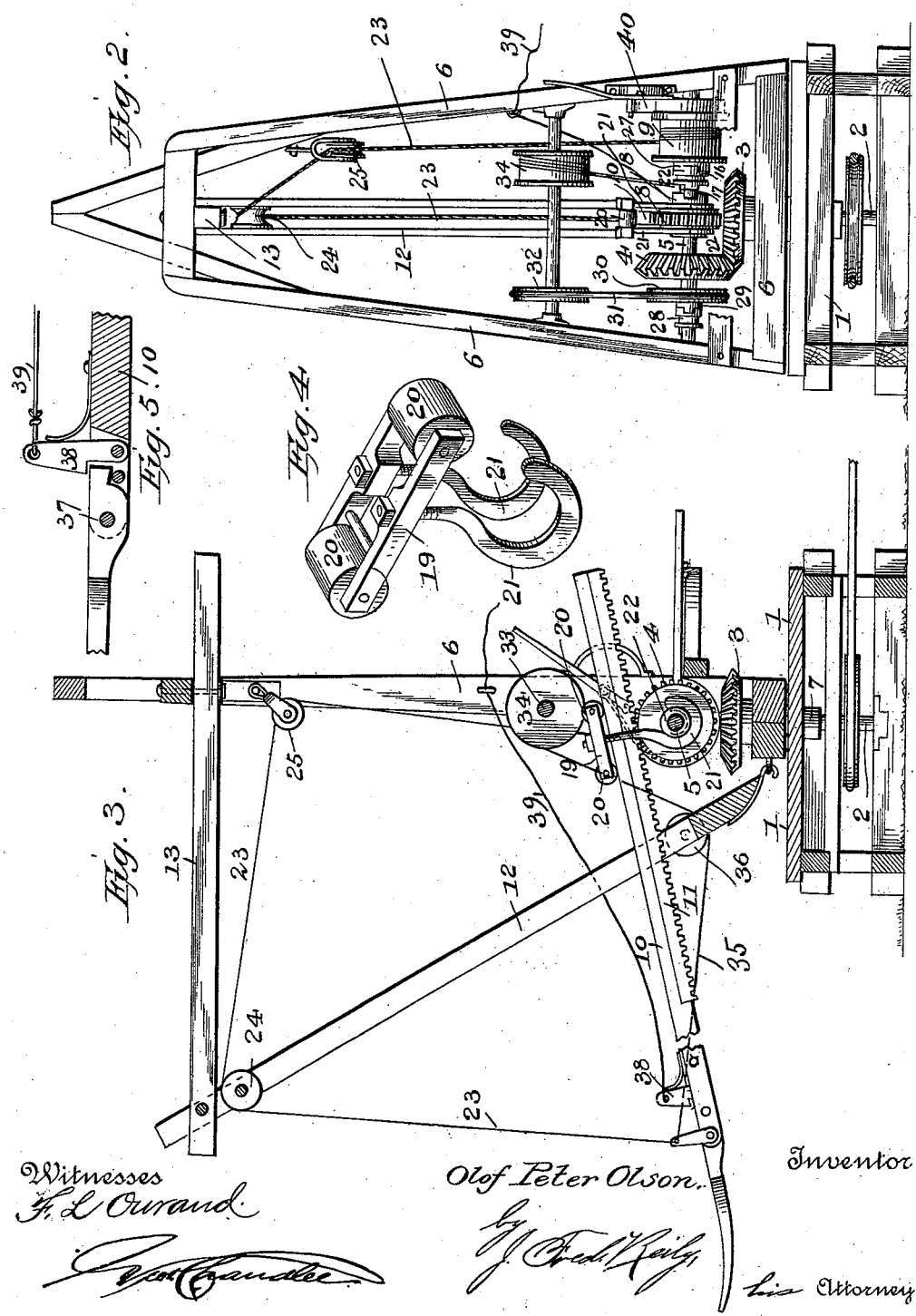
Witnesses
F. L. Ourand
[signature]
Olof Peter Olson. Inventor
by [signature]
his Attorney.
THE NORRIS PETERS CO., PHOTO-LITHO., WASHINGTON, D. C.

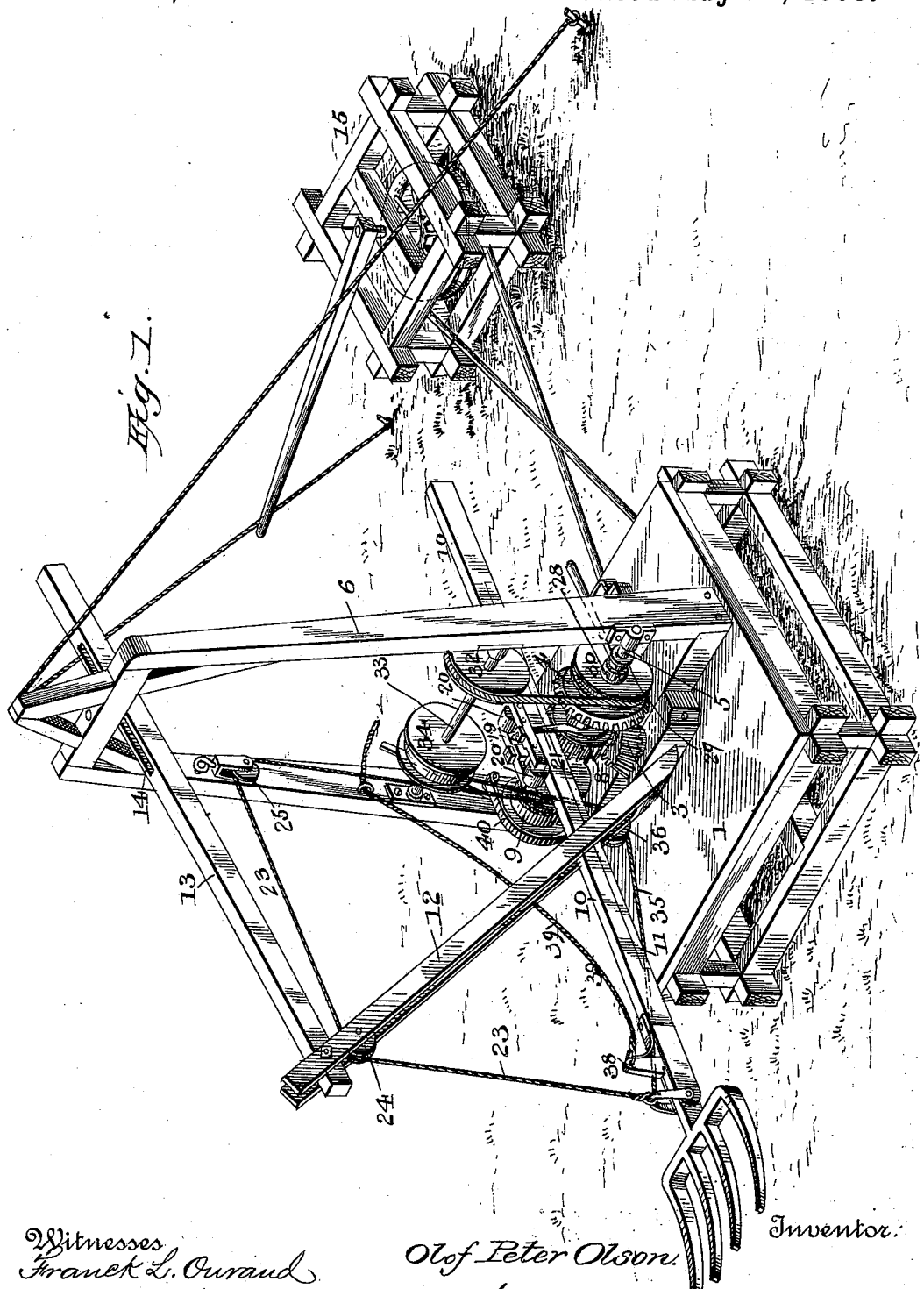

UNITED STATES PATENT OFFICE.

OLOF PETER OLSON, OF OSHKOSH, WISCONSIN.

COMBINED MANURE LOADER AND EXCAVATOR.

SPECIFICATION forming part of Letters Patent No. 539,703, dated May 21, 1895.

Application filed September 12, 1894. Serial No. 522,792. (No model.)

*To all whom it may concern:*

Be it known that I, OLOF PETER OLSON, a citizen of the United States, residing at Oshkosh, in the county of Winnebago and State of Wisconsin, have invented certain new and useful Improvements in a Combined Manure Loader and Excavator; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention consists in a combined manure loader and excavator, which combines among its practical advantages strength and comparative simplicity of construction, being devoid of all complicated parts such as would be liable to break or get out of order; rapidity in operation, and effectiveness in use; and ease of manipulation, and my invention will be hereinafter fully described and claimed.

Referring to the accompanying drawings, in which the same numerals of reference indicate corresponding parts in the several views, Figure 1 is a perspective view of my combined manure loader and excavator. Fig. 2 is a rear elevation of the same. Fig. 3 is a vertical sectional view taken on line *x x*, Fig. 2. Figs. 4 and 5 are detail views hereinafter described.

In the drawings, 1 indicates the lower supporting frame, in the center of which is mounted the vertical drive-shaft 2, having upon its upper end a bevel gear-wheel, 3, which meshes with a similar bevel gear-wheel 4 secured on the horizontal drive-shaft 5. The upright frame 6 of the derrick is centrally mounted at its lower end upon a collar and bearing, 7, which enables the derrick to be swung around in any direction. The horizontal shaft 5 is mounted in bearings in the lower part of this derrick frame, and upon it is loosely mounted the large spur wheel 8 and the drum 9. This spur wheel 8 is centrally arranged upon the horizontal shaft 5, and upon it rests the traveling arm 10, having its under side provided with the rack or series of teeth 11 with which the teeth of the spur wheel 8 mesh. The traveling arm 10 passes through the divided forward arm 12, which is hinged at its lower end to the base of the movable derrick frame 6, and at its upper end is connected by a pivot-bolt to the outer end of a horizontal bar 13, the inner end of which is slotted longitudinally, at 14, and adjustably secured to the derrick frame by a headed bolt, and nut, running through said slot.

It will be seen that when the vertical drive shaft 2 is revolved, by an endless rope or band running from a capstan 15 around a bandwheel on said shaft, the horizontal driveshaft will be revolved through the bevel gearwheels 3 and 4; when by sliding a clutch-sleeve, 16, which a feather, 17, causes to revolve with the shaft, into engagement with the clutch-section 18, on that end of the loosely-mounted spur wheel, the spur wheel will be revolved with the shaft, and its teeth meshing with the rack of the traveling bar 10 will run the same in or out, according to the direction in which the capstan is turned. The rack-bar is held in engagement on the spur wheel, and yet allowed to move freely, by the novel device consisting of the saddle, 19, which rests upon the top of the traveling bar and has the end friction-rollers 20, 20, and from the sides of this saddle depend the retaining hooks 21, 21, the flattened rounded lower ends of which fit in grooved collars 22 formed on each end or side of the spur-wheel; this device being shown in detail in Fig. 4. By this construction the saddle can swing freely to allow the end of the bar 10 carrying the fork or blade to swing down or be swung up, while always holding the rack bar in engagement with the spur wheel, as will be readily seen.

A rope, 23, runs from a bail at the outer end of the traveling bar up over a grooved pulley 24 journaled in the upper end of arm 12, then over a second pulley 25 on the derrick frame, and down to the drum 26, which is loosely mounted on the drive-shaft 5. When the traveling bar 10, with the fork or excavating blade at its outer end, has been run out by the spur wheel, its outer end dropping to take the load of manure or earth, to raise the shovel or fork it is only necessary to slide the clutch sleeve 16 to the right into engagement with the clutch-section 27 on that end of the drum when as the shaft 5 is revolved the drum will wind up the rope 23, thus raising the form or shovel at the outer end of the bar 10; the saddle 19, as before described, enabling this movement of the bar on the spur-wheel. When the double-ended clutch sleeve 16 is slid to the right to engage the drum, it is disengaged from the spur-wheel, so that the spur-wheel is not turned while the drum is being revolved. If it is desired to draw the shovel or fork farther in while the drum is elevating it, a clutch-sleeve 28 on the shaft 5 is thrown by its lever into engagement with the clutch-section 29 of a band-wheel 30, from which a band, 31, runs around a second band-wheel, 32, on an upper shaft 33, upon which is secured a small drum, 34, from which a rope, 35, runs to the outer end of the traveling bar, passing under a pulley 36. When thus thrown into engagement, this upper shaft and drum are revolved, winding up the rope 35, and drawing in the traveling bar on the loose spur wheel to the desired point, when said parts are at once thrown out of operation.

The traveling bar 10 may be fitted either with a fork, to be used in loading manure, or with a blade, to adapt it for use in excavating; the fork and blade being interchangeable; and the stem of either is pivotally secured in the bearing 37 at the outer end of the bar, and is provided with a projecting inner end adapted to be engaged by a spring-actuated catch, 38, from which a cord, 39, runs back within convenient reach of the operator, by pulling which the fork or blade may be tripped when it has been raised to the desired point, allowing the fork or blade to drop, turn down on its pivot, and thus discharge its load at the exact place desired.

The drum, 26, is provided with a brake, 40, by means of which when the clutch is disengaged and the drum is left loose upon the shaft the drum may be stopped and held against revolving to hold the fork or blade at the point to which it has been raised, while the clutch is thrown into engagement with the spur wheel; or the brake can be applied to prevent the drum from slipping around too rapidly in lowering the fork and outer end of the traveling bar, after the load has been discharged.

It will be seen that by the slotted construction of the inner end of the horizontal arm 13, said arm can be adjusted in or out, to bring the hoisting pulley 24, which the rope 23 runs up to and over, nearer to or out farther from the upright frame of the derrick, to adjust the elevating point formed by the said pulley.

Having thus described my invention, what I claim, and desire to secure by Letters Patent, is—

1. In a combined manure loader and excavator, the combination with the horizontal drive shaft and means for revolving the same, of the spur wheel, the drum, and the band wheel, loosely mounted on said shaft, clutch mechanism adapted to cause the same to revolve with the shaft when desired, the traveling bar mounted on the spur wheel and having the rack on its under side, and carrying the pivoted tool and spring catch at its outer end, a rope running from the outer end of the traveling bar over elevated pulleys to the drum, the upper shaft geared with the loose band-wheel on the drive shaft and carrying a small fixed drum, and a rope running from said drum to the outer end of the traveling bar; substantially as set forth.

2. The herein-described combined manure loader and excavator, consisting of the vertical drive shaft having the bevel gear wheel at its upper end and mounted in a base frame, means for revolving said shaft, the derrick frame mounted to turn on said base frame, the horizontal drive shaft mounted in the lower part of the derrick frame and having the bevel gear-wheel, the spur wheel, the drum, and the band wheel, loosely mounted on the horizontal drive shaft and having the end clutch-sections, the spur wheel having the grooved end collars, the sliding clutch sleeves and the levers for operating the same, the traveling bar, carrying at its outer end the pivoted tool and spring catch, and having the rack on its lower side, the saddle having the end friction rollers, resting upon the traveling bar, and having the side hooks engaging the grooved end collars of the spur wheel, a rope running from the outer end of the traveling bar over elevated pulleys to the drum, and a brake controlling said drum, the upper shaft geared with the loose band-wheel on the drive-shaft and carrying a small fixed drum, and a rope running from said drum to the outer end of the traveling bar; substantially as set forth, for the purposes specified.

In testimony whereof I affix my signature in presence of two witnesses.

OLOF PETER OLSON.

Witnesses:
BYRON E. VAN KEUREN,
CHARLES H. FORWARD.